(12) United States Patent
Banks et al.

(10) Patent No.: US 12,166,847 B2
(45) Date of Patent: *Dec. 10, 2024

(54) SYSTEMS AND METHODS FOR CLOUD BASED MESSAGING BETWEEN ELECTRONIC DATABASE INFRASTRUCTURE

(71) Applicant: Worldpay, LLC, Symmes Township, OH (US)

(72) Inventors: Walter Banks, Chandler, AZ (US); Christopher Guthrie, Phoenix, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,822

(22) Filed: Apr. 13, 2023

(65) Prior Publication Data

US 2023/0247113 A1 Aug. 3, 2023

Related U.S. Application Data

(63) Continuation of application No. 17/446,237, filed on Aug. 27, 2021, now Pat. No. 11,659,068, which is a continuation of application No. 16/845,186, filed on Apr. 10, 2020, now Pat. No. 11,134,139, which is a continuation of application No. 15/677,741, filed on Aug. 15, 2017, now Pat. No. 10,681,185.

(51) Int. Cl.
| | | |
|---|---|---|
| G06F 15/16 | (2006.01) | |
| G06Q 20/20 | (2012.01) | |
| G06Q 20/40 | (2012.01) | |
| H04L 12/40 | (2006.01) | |
| H04L 69/08 | (2022.01) | |
| H04L 67/10 | (2022.01) | |

(52) U.S. Cl.
CPC ............. *H04L 69/08* (2013.01); *G06Q 20/20* (2013.01); *G06Q 20/4012* (2013.01); *H04L 12/40032* (2013.01); *H04L 67/10* (2013.01)

(58) Field of Classification Search
CPC ... H04L 69/08; H04L 12/40032; H04L 67/10; G06Q 20/20; G06Q 20/4012
USPC .......................................................... 709/230
See application file for complete search history.

(56) References Cited

U.S. PATENT DOCUMENTS

| | | | |
|---|---|---|---|
| 7,734,705 B1* | 6/2010 | Wheeler, Jr. ......... | G06Q 10/107 709/206 |
| 9,871,848 B1 | 1/2018 | Shanmugam | |
| 11,134,139 B2 | 9/2021 | Banks et al. | |
| 11,659,068 B2* | 5/2023 | Banks ............... | H04L 12/40032 709/230 |
| 2006/0053425 A1 | 3/2006 | Berkman et al. | |
| 2010/0275247 A1* | 10/2010 | Jerichow .......... | H04N 21/25875 726/4 |

(Continued)

*Primary Examiner* — Alan S Chou
(74) *Attorney, Agent, or Firm* — Bookoff McAndrews, PLLC

(57) ABSTRACT

A method of cloud based messaging includes receiving a message and a message topic from a message sender, storing the message topic and the message on a message queue, retrieving the message from the message queue, translating the message from a message bus protocol to a recipient protocol and transmitting the translated message to a message recipient.

20 Claims, 7 Drawing Sheets

(56) References Cited

U.S. PATENT DOCUMENTS

| | | |
|---|---|---|
| 2010/0308109 A1* | 12/2010 | Maddocks ............ G07F 7/1025 |
| | | 711/E12.001 |
| 2012/0179538 A1* | 7/2012 | Hines ................. G06Q 30/0242 |
| | | 705/14.51 |
| 2014/0040014 A1 | 2/2014 | Anand et al. |
| 2014/0341217 A1 | 11/2014 | Eisner et al. |
| 2015/0006620 A1 | 1/2015 | Joseph et al. |
| 2016/0014575 A1 | 1/2016 | Smith |
| 2016/0127314 A1 | 5/2016 | Maria |
| 2017/0006135 A1* | 1/2017 | Siebel ................... G06Q 10/06 |
| 2017/0103378 A1 | 4/2017 | Pan |

* cited by examiner

SYSTEMS AND METHODS FOR CLOUD BASED MESSAGING BETWEEN ELECTRONIC DATABASE INFRASTRUCTURE

CROSS-REFERENCE TO RELATED APPLICATION(S)

This patent application is a continuation of and claims the benefit of priority to U.S. application Ser. No. 17/446,237, filed on Aug. 27, 2021, which is a continuation of U.S. application Ser. No. 16/845,186, now U.S. Pat. No. 11,134,139, filed on Apr. 10, 2020, which is a continuation of U.S. application Ser. No. 15/677,741, now U.S. Pat. No. 10,681,185, filed on Aug. 15, 2017, the entireties of which are incorporated herein by reference.

TECHNICAL FIELD

Various embodiments of the present disclosure relate generally to an electronic payment infrastructure and, more particularly, to a message bus transmitting messages between components of an electronic payment infrastructure.

BACKGROUND

Traditionally, merchants and other store owners have point of sale (POS) terminals and POS systems that can accept check or payment card payments from consumers for goods and services. Such POS systems may include PIN pads at which a consumer may enter payment and/or personal information in order to complete payment processing requests for purchases. Communication between a POS terminal, a PIN Pad, and other components of the merchant's payment processing system may involve transmitting message according to different protocols and via different application programming interfaces (APIs). When a new component is added, the new protocols and APIs for the new component are typically added to the system. This may result in delays in adopting new components or difficulty in adapting to a merchant's existing equipment.

The present disclosure is directed to overcoming one or more of these above-referenced challenges.

SUMMARY OF THE DISCLOSURE

According to certain aspects of the disclosure, systems and methods are disclosed for cloud based messaging.

In one embodiment, a computer-implemented method is disclosed for cloud based messaging. The method includes: receiving a message and a message topic from a message sender, storing the message topic and the message on a message queue, retrieving the message from the message queue, translating the message from a message bus protocol to a recipient protocol, and transmitting the translated message to a message recipient.

In accordance with another embodiment, a system is disclosed for cloud based messaging. The system comprises: a memory having processor-readable instructions stored therein; and a processor configured to access the memory and execute the processor-readable instructions, which when executed by the processor configures the processor to perform a plurality of functions, including functions to: receive a message and a message topic from a message sender, store the message topic and the message on a message queue, retrieve the message from the message queue, translate the message from a message bus protocol to a recipient protocol, and transmit the translated message to a message recipient.

According to certain aspects of the disclosure, non-transitory computer readable media are disclosed storing a program causing a computer to execute a method of cloud based messaging, One method comprises: receiving a message and a message topic from a message sender, storing the message topic and the message on a message queue, retrieving the message from the message queue, translating the message from a message bus protocol to a recipient protocol, and transmitting the translated message to a message recipient.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that messages may be transmitted between components according to a common communications protocol and API, without each component having knowledge of the particular communications protocol and API of another component. The disclosed systems and methods discussed below may allow more efficient communication between components and greater flexibility in the configuration of a transaction processing system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to communication between components of an electronic transaction processing system.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A merchant payment processing system may typically include one or more point of sale (POS) terminals in communication with one or more personal identification number (PIN) pads. Once a customer's transaction entered at the POS device is ready for completion, the POS device may send messages through the merchant's transaction processing system to a PIN pad. This interaction may include presentation of payment credentials, such as a payment vehicle, and entry of customer identification, such as a PIN, biometric information, etc. The PIN pad and other components of the transaction processing system may communicate by way of communications protocols and APIs specific to each component.

Desirably, in order to allow a flexible communication between a PIN pad, a POS device and other components, such communications may be processed by an intermediary process to transmit messages among the components. For example, the merchant's payment processing system may include a message bus that may operate on a common communications protocol. Thus, each component may avoid directly communicating with another component and may avoid necessarily having information about each component's communications protocols and APIs.

Figure 6:
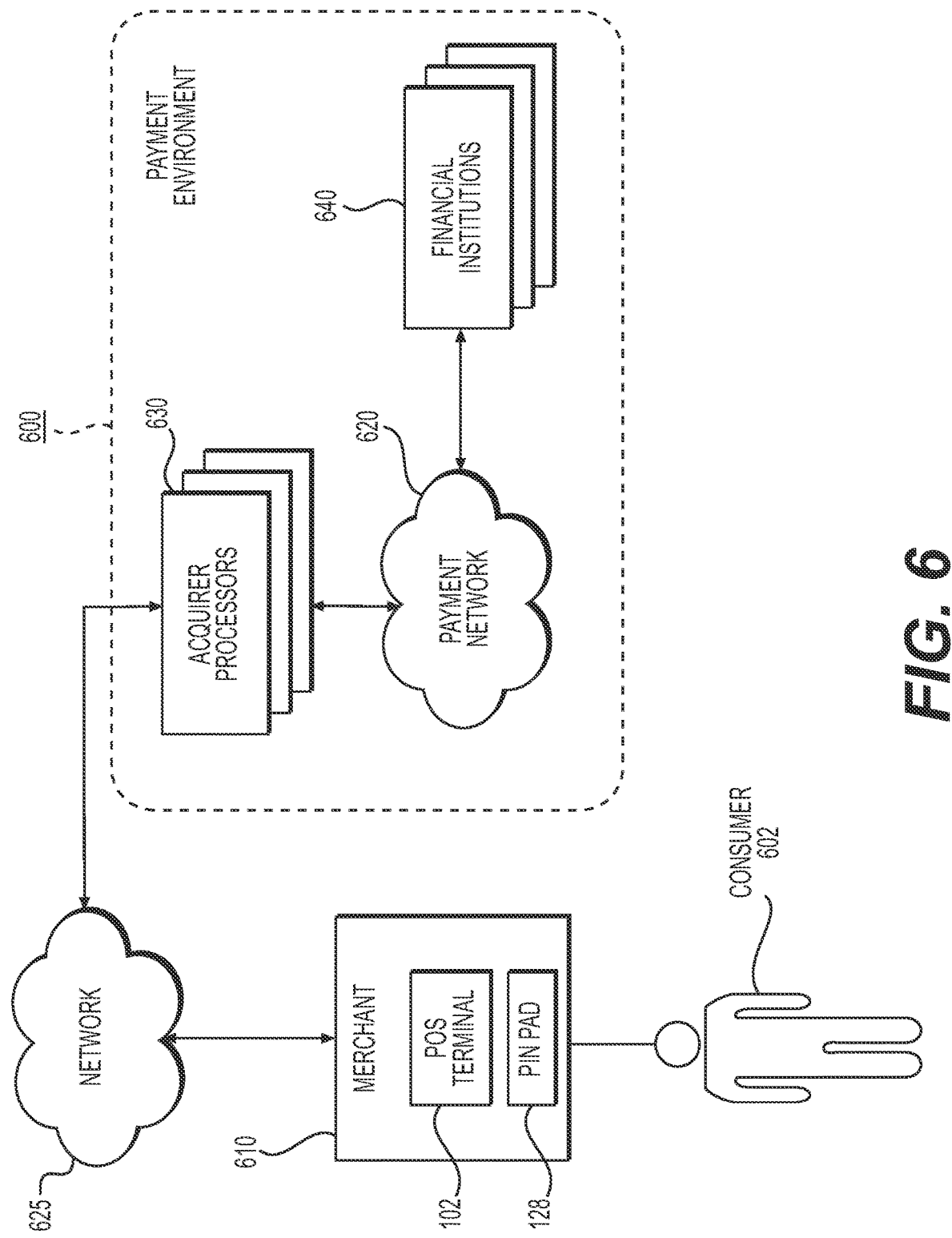
FIG. 6 depicts a block diagram of an electronic payment processing system.

As shown in FIG. 6, in an electronic payment processing system, a consumer 602, during the checkout process with a merchant 610, pays for goods or services from merchant 610 at a PIN pad 128 associated with POS terminal 102. Consumer 602 may use a payment card as payment and the transaction is processed through a payment environment 600. Because merchant 610 generally can use a different bank or financial institution 640 than consumer 602, an acquirer processor 630 handles the financial transactions that transfer payment between the financial institution 640 of consumer 602 and that of merchant 610. Consumer 602 submits payment information at the PIN pad 128 associated with POS terminal 102 of merchant 610, such as by swiping his or her payment card, inserting his or her chip-based payment card, through wireless near field communication (NFC), etc., or by any other suitable means. PIN pad 128 sends a payment request by way of a computer network 625 to an acquirer processor 630. Alternatively, such a request may be sent by a component that controls a flow of a transaction, such as point of sale (POS) engine 106 depicted in FIG. 1. Acquirer processor 630 requests, by way of payment network 620, an electronic transfer of funds from the received funds to the financial institution 640 associated with merchant 610.

Figure 1:
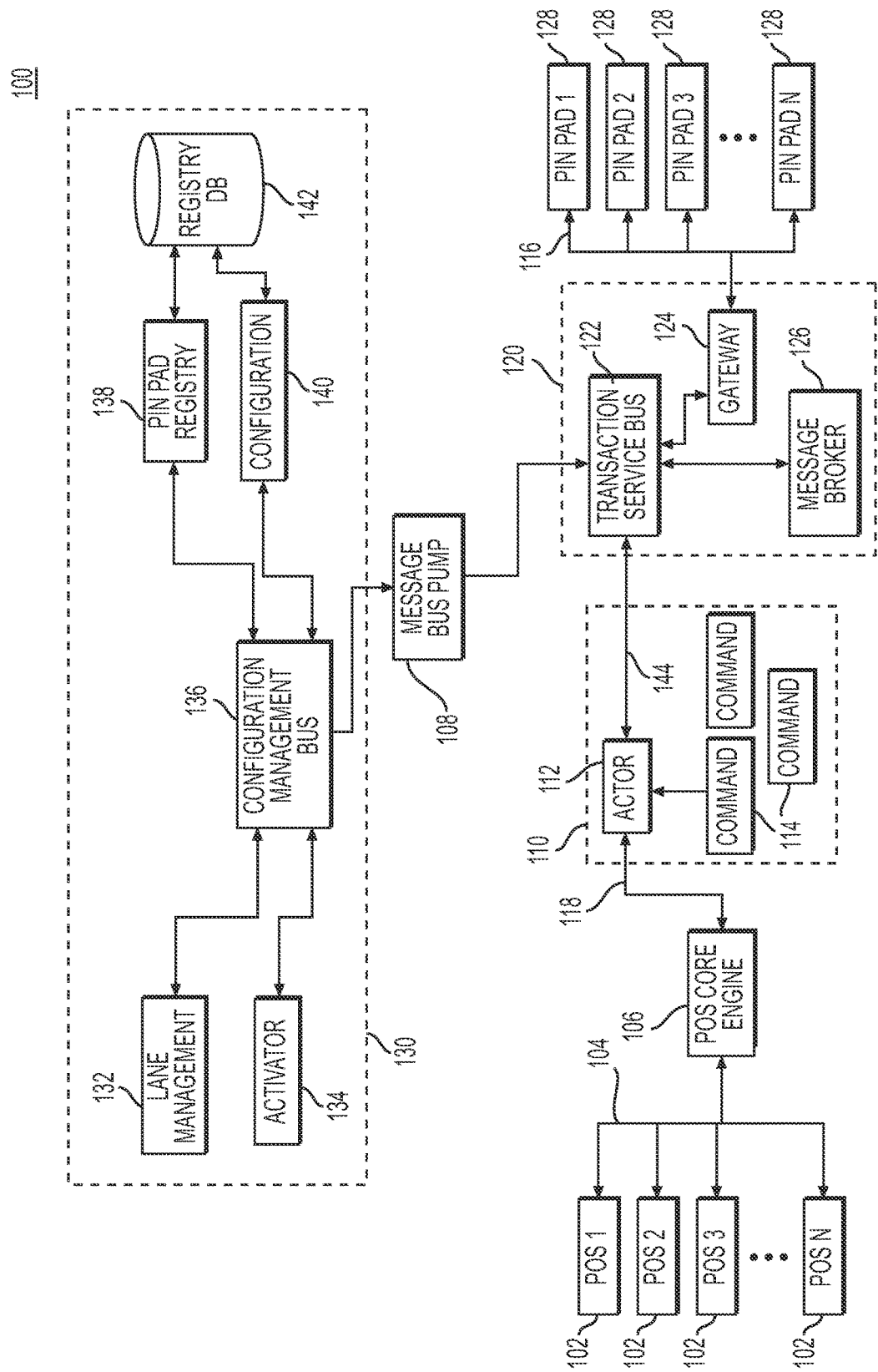
FIG. 1 depicts an exemplary system infrastructure for electronic payment transactions, according to one or more embodiments.
Figure 2:
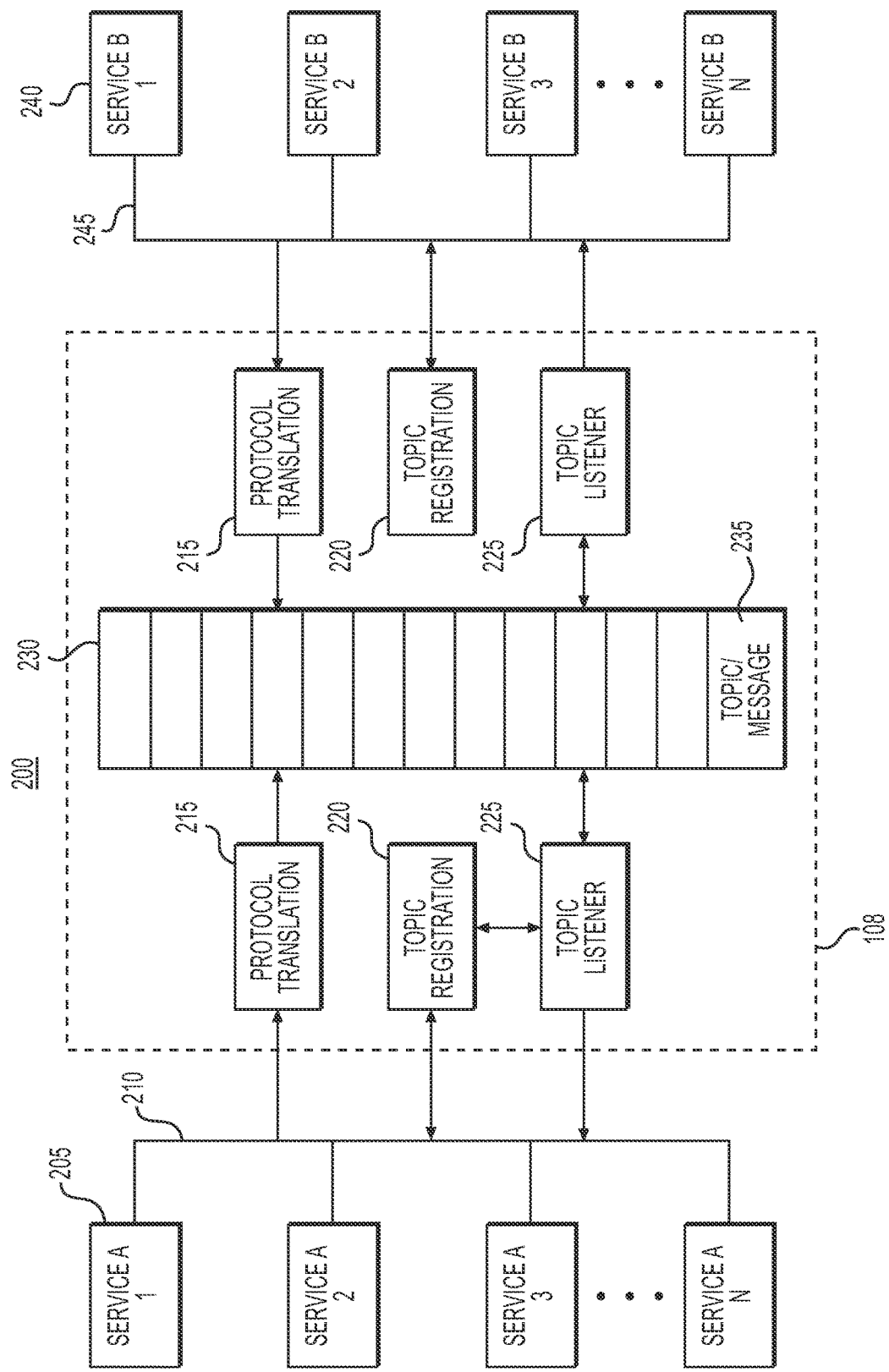
FIG. 2 depicts an exemplary system infrastructure for cloud based messaging, according to one or more embodiments.

Merchant 610 may provide an infrastructure for processing electronic payment requests. FIGS. 1 and 2 depict an exemplary system infrastructure for payment processing within a merchant environment, according to one or more embodiments.

As shown in FIG. 1, an infrastructure 100 for processing electronic payment requests may include one or more point of sale (POS) devices 102, which may be in communication with a POS engine 106, and one or more personal identification number (PIN) pad terminals 128, which may be in communication with a socket gateway 124. POS devices 102 may communicate a sale request message over computer network 104 to POS engine 106. POS engine 106 may be embodied, for example, as middleware that may transmit commands to control a PIN pad 128, such as by sending a payment request to PIN pad transaction generator 110 over computer network 118. PIN pad transaction generator 110 may generate one or more PIN pad commands 114 for processing by a transaction generator 112. Transaction generator 112 may take in a transaction request from the POS engine 106 and PIN pad specific commands 114 for the transaction. Transaction generator 112 may further take in expected responses from PIN pad 128. Transaction generator 112 may manage the entire transaction using, for example, a state machine for the specific transaction. PIN pad transaction generator 110 will be described in greater detail below with respect to FIG. 2.

Infrastructure 100 for processing electronic payment requests may further include a PIN pad device gateway 120, which may provide commination with PIN pad terminals 128. PIN pad device gateway 120 may include a message broker that may process incoming sales transaction messages, a transaction service bus topic 122, and one or more device gateways 124.

As shown in FIG. 1, infrastructure 100 may further include a configuration management service 130, which may provide configuration services for PIN pad terminals 128. Configuration management service 130 may include a configuration service 140, a PIN pad registry 138, and a PIN pad database 142. Configuration service 140 may, if necessary, configure the PIN pad upon connection of the PIN pad to the infrastructure. PIN pad registry 138 and PIN pad database 142 may maintain data associating each PIN pad with an account or merchant. Configuration management service 130 may further include a lane management service 132 and a PIN Pad activator 134.

Infrastructure 100 may be embodied as a semi-integrated solution and may further control the PIN pad on behalf of the POS device software. Such control may include controlling a transaction flow or sequence including, for example, prompting for payment card swipe or insert, sending a transaction request for authorization, prompting for a consumer signature, etc.

Turning to FIG. 2, a system infrastructure 200 for cloud based messaging may be provided for communication between multiple components or services. As shown in FIG. 2, a service A (205) may send a message to a service B (240) by way of message bus pump 108. The message may be, for example, a text message, an encoded command message, a data structure, etc. Message bus pump 108 may include a message bus 230, which may contain one or more topics/messages 235. Service A may transmit the message to message bus pump 108 by way of communications network 210. Communications network 210 may be a cloud-based connection, a wired network, a wireless network, or any other kind of suitable communications network. The message may be transmitted to message bus 230 directly according to a native communications protocol of message bus 230, or it may be translated to such a protocol by protocol transaction service 215. In order to receive a message, service B may first register a topic with message bus pump 108 by way of topic registration service 220. Once a topic is registered, a topic listener 225 may wait for a message matching the registered topic to appear in message bus 230. Topic listener 225 may identify a message matching the registered topic by one of, for example, periodically polling message bus 230 for matching messages, registering a callback method to be called by the message bus 230 when a matching message is received, etc. When a matching message is found, topic listener 235 may transmit the message to service B by way of communications network 245. Communications network 245 may be a cloud-based connection, a wired network, a wireless network, or any other kind of suitable communications network. The message may be transmitted from message bus 230 directly according to a native communications protocol of message bus 230, or it may be translated to an appropriate protocol for service B by protocol transaction service 215.

Services utilizing message bus pump 108, such as service A (205) and service B (240), may be grouped into zones comprising services providing related services or services that are geographically or logically co-located. For example, services related to point of sale (POS) terminals may comprise a particular zone. In addition, services operating for a particular merchant or at a particular merchant location may comprise a particular zone. In one or more embodiments, message bus pump 108 may transmit messages only between services operating in different zones.

Figure 3:
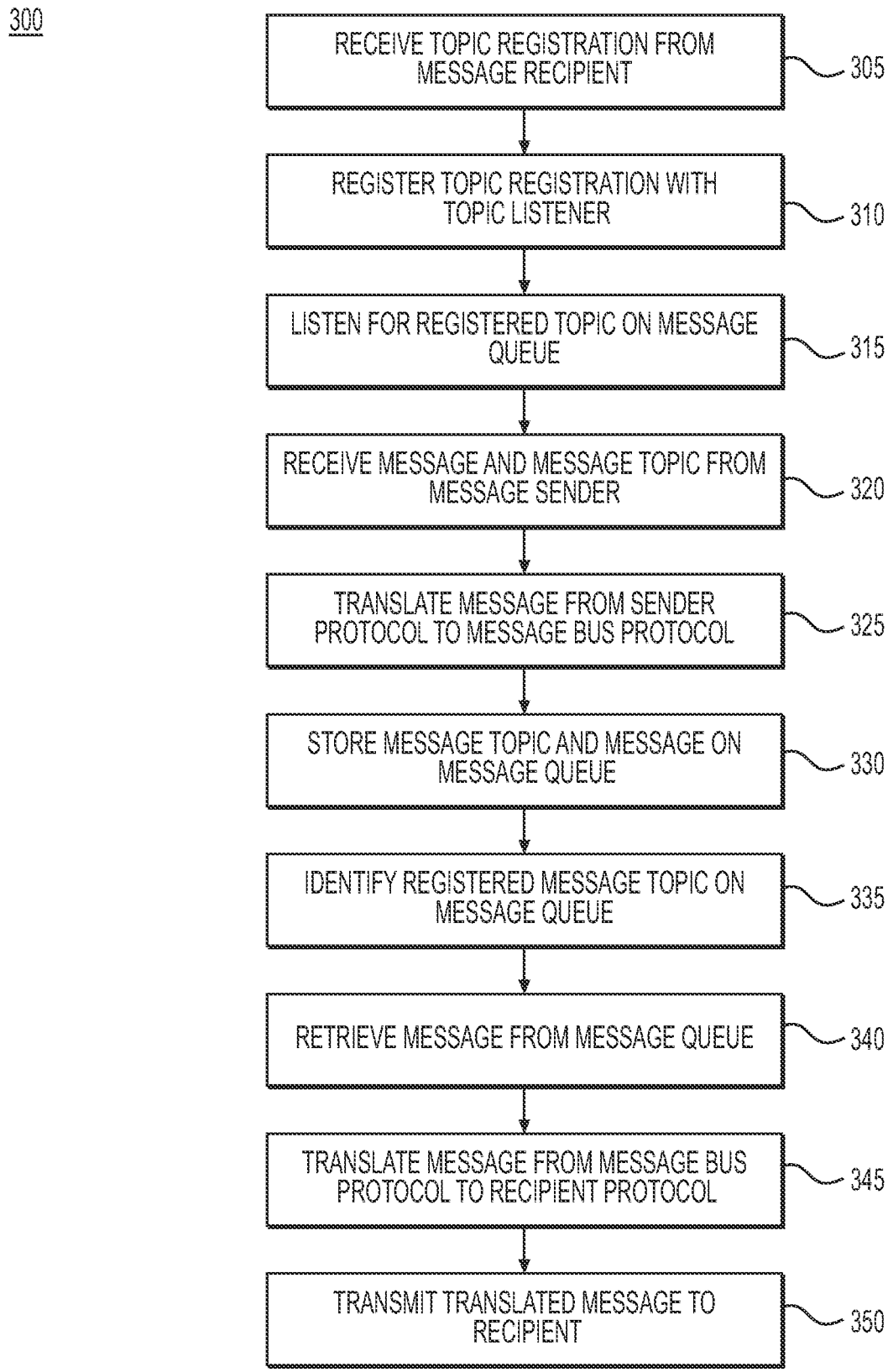
FIG. 3 depicts a flowchart of a method of cloud based messaging, according to one or more embodiments.

FIG. 3 depicts a flowchart of a method of cloud based messaging, according to one or more embodiments. As shown in FIG. 3, at operation 305, message bus pump 108 may receive a topic registration from a potential message recipient, such as service B (240) depicted in FIG. 3. At operation 310, message bus pump 108 may register the topic registration with topic listener 225. At operation 315, message bus pump 108 may listen for the registered topic on message queue 230. At operation 320, message bus pump 108 may receive a message and message topic from a message sender, such as service A (210) depicted in FIG. 3. At operation 325, message bus pump 108 may translate a message from a sender protocol to a message bus protocol. Such a translation may be performed by a protocol translation service, such as protocol translation service 215 depicted in FIG. 3. At operation 330, message bus pump 108 may store the message topic and message on the message queue. At operation 335, message bus pump 108 may identify a message matching the registered message topic on message queue. Such recognition may be performed by a topic listener, such as topic listener 225 depicted in FIG. 3. At operation 340, message bus pump 108 may retrieve the matching message from the message queue. At operation 345, message bus pump 108 may translate the message from the message bus protocol to a recipient protocol. Such a translation may be performed by a protocol translation service, such as protocol translation service 215 depicted in FIG. 3. At operation 350, message bus pump 108 may transmit the translated message to the recipient.

Figure 4:
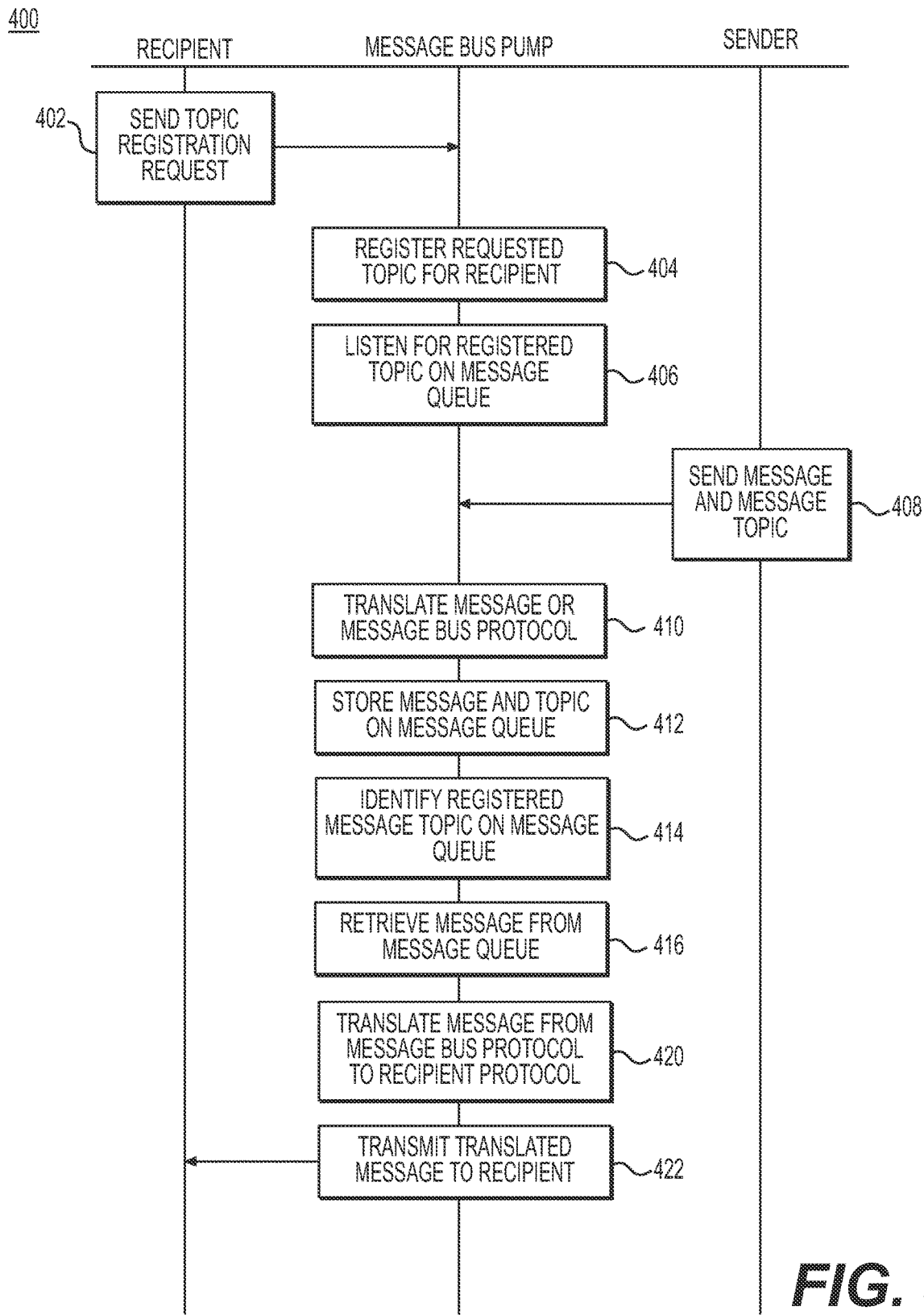
FIG. 4 depicts a communication flow diagram of a method of cloud based messaging, according to one or more embodiments.

FIG. 4 depicts a communication flow diagram of a method of cloud based messaging, according to one or more embodiments. As shown in FIG. 4, at operation 402, a recipient, such as service B (240) depicted in FIG. 3, may send a topic registration request to a message bus pump. In operation 404, the message bus pump may register the requested topic for the recipient. In operation 406, the message bus pump may listen for the registered topic on the message queue. Such listening may be performed by a topic listener, such as topic listener 225 depicted in FIG. 3. In operation 408, a sender may send a message and a message topic to the message bus pump. In operation 410, the message bus pump may translate the message to a message bus protocol. Such a translation may be performed by a protocol translation service, such as protocol translation service 215 depicted in FIG. 3. In operation 412, the message bus pump may store the translated message and the topic on a message queue. In operation 414, the message bus pump may identify registered message topic on message queue. In operation 416, the message bus pump may retrieve the message from the message queue. In operation 420, the message bus pump may translate the message from a message bus protocol to a recipient protocol. Such a translation may be performed by a protocol translation service, such as protocol translation service 215 depicted in FIG. 3. In operation 422, the message bus pump may transmit translated message to recipient.

Figure 5:
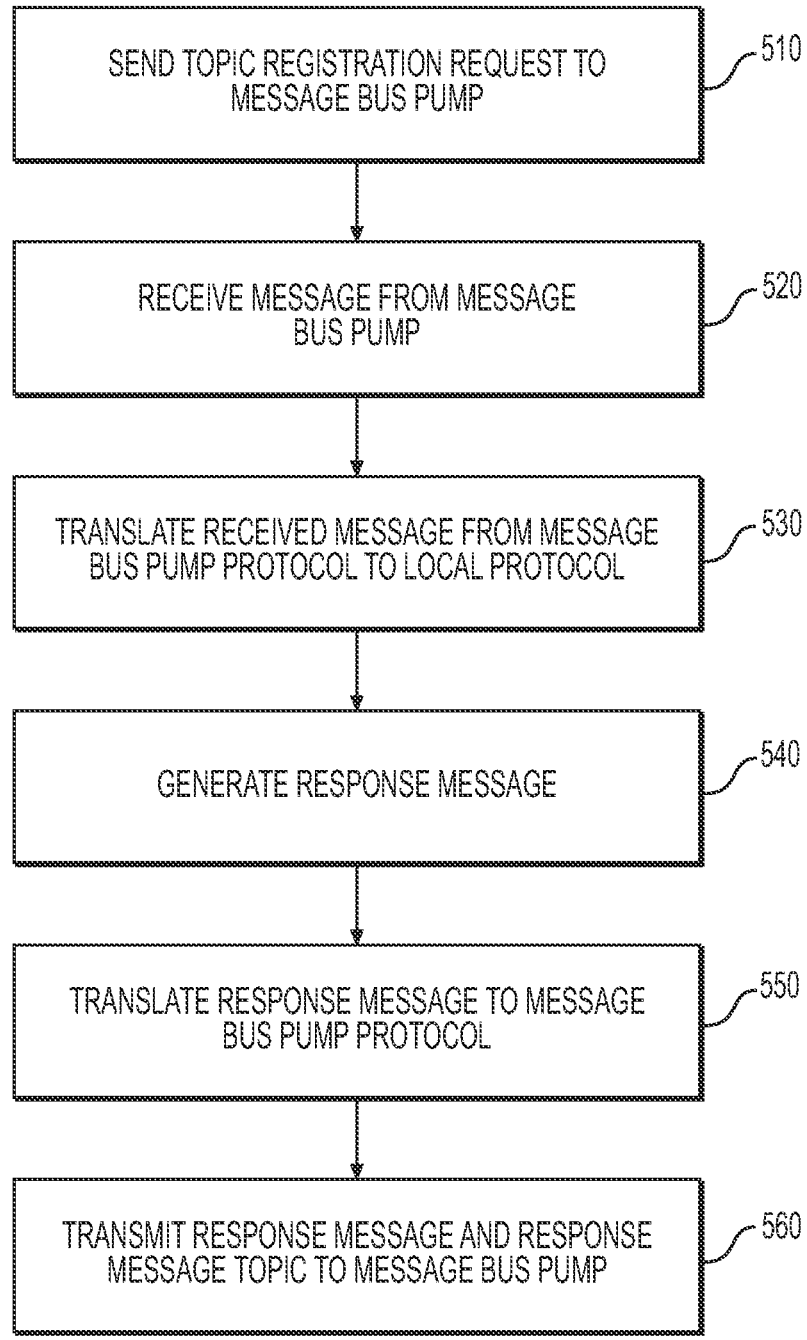
FIG. 5 depicts a flowchart of a method of cloud based messaging, according to one or more embodiments.

FIG. 5 depicts a flowchart of a method of cloud based messaging, according to one or more embodiments. As shown in FIG. 5, at operation 510, a message recipient may send a topic registration request to the message bus pump. At operation 520, the message recipient may receive a message from the message bus pump. At operation 530, the message recipient may translate the received message from a message bus pump protocol to a local protocol. Such a translation may be alternatively be performed by a protocol translation service, such as protocol translation service 215 depicted in FIG. 3. At operation 540, the message recipient may generate a response message. At operation 550, the message recipient may translate the response message to a message bus pump protocol. Such a translation may be alternatively be performed by a protocol translation service. At operation 560, the message recipient may transmit the response message and the response message topic to the message bus pump.

Any suitable system infrastructure may be put into place to provide a cloud based device gateway. FIGS. 1, 2, and 6 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1, 2 and 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 7:
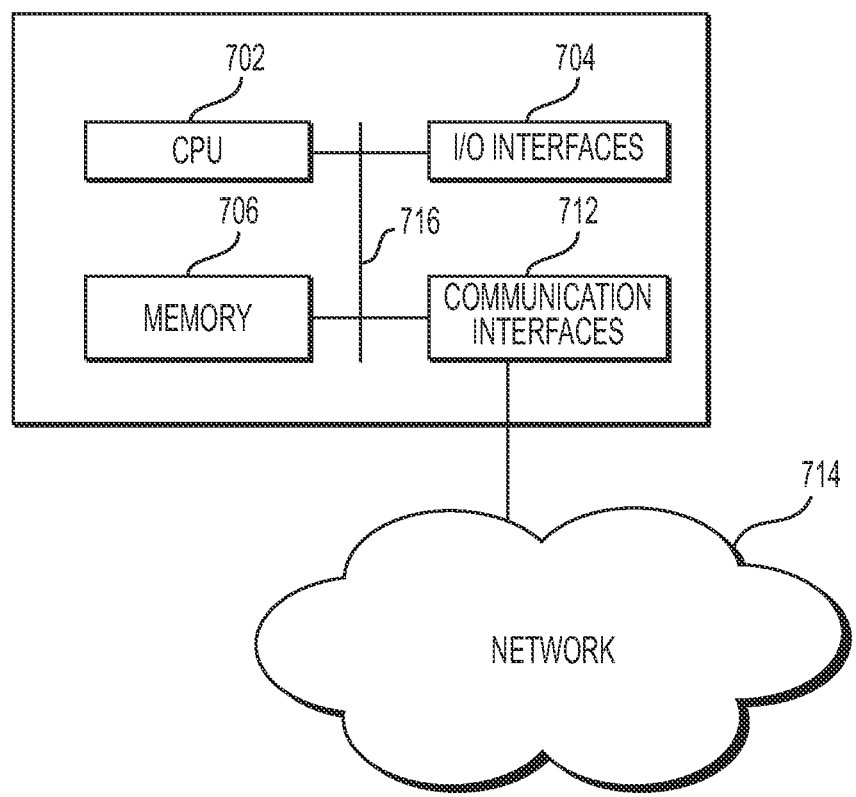
FIG. 7 is a block diagram of an example computing environment, according to one or more embodiments.

The systems and processes described above may be performed on or between one or more computing devices. FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 includes a processor 702 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 702, or memories 706 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 708 may be configured to transmit to, or receive data from, other computing devices 700 across a network 712. The network and communication interfaces 708 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 708 may include wire data transmission links such as Ethernet and TCP/IP. The communication interfaces 708 may include wireless protocols for interfacing with private or public networks 712. For example, the network and communication interfaces 708 and protocols may include interfaces for communicating with private wireless networks such as Wi-Fi network, one of the IEEE 802.11x family of networks, or another suitable wireless network. The network and communication interfaces 708 may include interfaces and protocols for communicating with public wireless networks 708, using for example wireless protocols used by cellular network providers, including Code Division Multiple Access (CDMA) and Global System for Mobile Communications (GSM). A computing device 700 may use network and communication interfaces 708 to communicate with hardware modules such as a database or data store, or one or more servers or other networked computing resources. Data may be encrypted or protected from unauthorized access.

In various configurations, the computing device 700 may include a system bus 710 for interconnecting the various components of the computing device 700, or the computing device 700 may be integrated into one or more chips such as programmable logic device or application specific integrated circuit (ASIC). The system bus 710 may include a memory controller, a local bus, or a peripheral bus for supporting input and output devices 704, and communication interfaces 708. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of cloud based messaging between a point of sale (POS) device and a personal identification number (PIN) pad, the method comprising:
   receiving a message from the POS device;
   translating the message from a message bus protocol to a recipient protocol; and
   transmitting the translated message to the PIN pad.

2. The method of claim 1, the method further comprising:
   receiving a topic registration request from the PIN pad;
   registering the topic registration with a topic listener; and
   listening for a message having the registered topic on a message queue.

3. The method of claim 2, the method further comprising:
   identifying the registered message topic on the message queue.

4. The method of claim 1, the method further comprising:
   translating the message from a sender protocol to the message bus protocol.

5. The method of claim 1, further comprising:
   storing a message topic and the message on a message queue;
   periodically polling the message queue for matching messages or registering a callback method to be called by the message queue when a matching message is received; and
   retrieving the message from the message queue.

6. The method of claim 1, wherein the message is one of a text message, an encoded command message, and a data structure.

7. The method of claim 1, wherein:
   the POS device is among a plurality of POS devices,
   the PIN pad is among a plurality of PIN pads,
   the plurality of POS devices and the plurality of PIN pads are organized into logical groups, and
   the POS device and the PIN pad are from different logical groups.

8. A computer system for cloud based messaging between a point of sale (POS) device and a personal identification number (PIN) pad, the system comprising:
   a memory having processor-readable instructions stored therein; and
   a processor configured to access the memory and execute the processor-readable instructions, which when executed by the processor configures the processor to perform a plurality of functions, including functions to:
   receive a message from the POS device;
   translate the message from a message bus protocol to a recipient protocol; and
   transmit the translated message to the PIN pad.

9. The computer system of claim 8, wherein the plurality of functions performed by the processor when executing the processor-readable instructions further includes functions to:
   receive a topic registration request from the PIN pad;
   register the topic registration with a topic listener; and
   listen for a message having the registered topic on a message queue.

10. The computer system of claim 9, wherein the plurality of functions performed by the processor when executing the processor-readable instructions further includes functions to:
    identify the registered message topic on the message queue.

11. The computer system of claim 8, wherein the plurality of functions performed by the processor when executing the processor-readable instructions further includes functions to:
    translate the message from a sender protocol to the message bus protocol.

12. The computer system of claim 8, wherein the plurality of functions performed by the processor when executing the processor-readable instructions further includes functions to:
    store a message topic and the message on a message queue;
    periodically poll the message queue for matching messages or registering a callback method to be called by the message queue when a matching message is received; and
    retrieve the message from the message queue.

13. The computer system of claim 8, wherein the message is one of a text message, an encoded command message, and a data structure.

14. The computer system of claim 8, wherein:
    the POS device is among a plurality of POS devices,
    the PIN pad is among a plurality of PIN pads,
    the plurality of POS devices and the plurality of PIN pads are organized into logical groups, and
    the POS device and the PIN pad are from different logical groups.

15. A non-transitory computer readable medium storing a program causing a computer to execute a method of cloud based messaging between a point of sale (POS) device and a personal identification number (PIN) pad, the method comprising:
    receiving a message from the POS device;
    translating the message from a message bus protocol to a recipient protocol; and
    transmitting the translated message to the PIN pad.

16. The non-transitory computer readable medium according to claim 15, the method further comprising:
    receiving a topic registration request from the PIN pad;
    registering the topic registration with a topic listener; and
    listening for a message having the registered topic on a message queue.

17. The non-transitory computer readable medium according to claim 15, the method further comprising:
    translating the message from a sender protocol to the message bus protocol.

18. The non-transitory computer readable medium according to claim 15, the method further comprising:
    storing a message topic and the message on a message queue;
    periodically polling the message queue for matching messages or registering a callback method to be called by the message queue when a matching message is received; and
    retrieving the message from the message queue.

19. The non-transitory computer readable medium according to claim 15, wherein the message is one of a text message, an encoded command message, and a data structure.

20. The non-transitory computer readable medium according to claim 15, wherein:
    the POS device is among a plurality of POS devices,
    the PIN pad is among a plurality of PIN pads,
    the plurality of POS devices and the plurality of PIN pads are organized into logical groups, and the POS device and the PIN pad are from different logical groups.

\* \* \* \* \*